United States Patent
McGrath et al.

(10) Patent No.: US 7,107,174 B2
(45) Date of Patent: Sep. 12, 2006

(54) DISAMBIGUATING LIKE TESTABLE OBJECTS IN A FUNCTIONAL TESTING TOOL

(75) Inventors: Frank McGrath, Wellesley, MA (US); Mark Metheny, Shirley, MA (US); Kenneth Sandler, Billerica, MA (US); William C. Tobin, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/746,536

(22) Filed: Dec. 23, 2003

(65) Prior Publication Data
US 2004/0204894 A1    Oct. 14, 2004

Related U.S. Application Data

(60) Provisional application No. 60/457,631, filed on Mar. 25, 2003.

(51) Int. Cl.
*G06F 19/00* (2006.01)
(52) U.S. Cl. ............ 702/123; 702/108; 702/188; 717/124; 717/126; 717/130; 370/254; 714/38; 714/32; 706/11; 712/228
(58) Field of Classification Search ............ 702/108, 702/123, 188; 717/124–126, 130, 135; 370/254; 714/38, 32, 82; 706/11; 712/228
See application file for complete search history.

(56) References Cited

U.S. PATENT DOCUMENTS

| | | | | |
|---|---|---|---|---|
| 4,688,195 A | * | 8/1987 | Thompson et al. | 706/11 |
| 5,850,511 A | * | 12/1998 | Stoecker et al. | 714/38 |
| 6,532,401 B1 | * | 3/2003 | Tackett et al. | 700/245 |
| 6,629,097 B1 | * | 9/2003 | Keith | 707/5 |
| 6,983,400 B1 | * | 1/2006 | Volkov | 714/38 |

OTHER PUBLICATIONS

Eric et al., 'Sensing Strategies for Disambiguating Among Multiple Objects in Known Poses', Dec. 1986, IEEE Publication, vol. RA2, No. 4, pp. 196-213.*
Maletic et al., Using Latent Semantic Analysis to Identify Similarities in Source Code to Support Program Understanding, Jan. 2000, IEEE Publication, pp. 46-53.*

* cited by examiner

*Primary Examiner*—Marc S. Hoff
*Assistant Examiner*—Elias Desta
(74) *Attorney, Agent, or Firm*—Steven C. Kurlowecz; Steven M. Greenberg; Carey Rodriguez Greenberg & Paul LLP

(57) ABSTRACT

The present invention is a system, method and apparatus for disambiguating two like objects in two separate application containers. In accordance with the present invention, a pointer to one of the application containers can be obtained. Subsequently, the pointer can be provided as a parameter to a function call for an object in the one of the separate application containers. Notably, the application container can include one of a content browser and a distributable application.

6 Claims, 2 Drawing Sheets

DISAMBIGUATING LIKE TESTABLE OBJECTS IN A FUNCTIONAL TESTING TOOL

CROSS-REFERENCE TO RELATED APPLICATIONS

This patent application claims the benefit under 35 U.S.C. § 119(e) of presently pending U.S. Provisional Patent Application 60/457,631, entitled LOCATING A TESTABLE OBJECT IN A FUNCTIONAL TESTING TOOL, filed on Mar. 25, 2003, the entire teachings of which are incorporated herein by reference.

BACKGROUND OF THE INVENTION

1. Statement of the Technical Field

The present invention relates to the field of software functional testing and more particularly to disambiguating like objects in a functional testing tool.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

In operation, the conventional functional testing tool can monitor and record the interaction between end user and GUI during a recording phase of functional testing. In this regard, a testing script can be produced based upon the identity of GUI elements addressed by the end user and the sequence in which the GUI elements are addressed. Within the script, GUI elements, referred to herein as "objects", can be identified by absolute reference to each object. The absolute reference can include any number of element properties which, when combined with one another, can uniquely identify the desired object. Properties can include any explicit object property such as a data or method member, or any metadata associated with the object. Examples can include the class index, the accessible role, the object position, associated text, class name, and child and parent element identity, just to name a few.

Yet, the skilled artisan will recognize the inherent danger in absolutely identifying an object. Specifically, during the course of developing an application, the properties of an object can change as elements are added, modified and deleted from the application. Moreover, ambiguities can arise where the uniqueness of a GUI related object is dissolved as a result of an added, modified or deleted object. Oftentimes, the generic reference to a GUI element in an application under test can fail for ambiguity where multiple applications or application containers under test include a similar element. For instance, the "back" button in a content browser will exist in each content browser spawned as part of an application under test. Similarly, an "OK" button may exist in multiple applications spawned as part of an application under test. Consequently, an absolute reference to an object in the GUI can be rendered invalid and unresolvable in the face of application modifications. Therefore, the script generated to exercise the GUI suddenly can become inoperable.

To address the foregoing deficiencies several popular functional testing tools have augmented the number of properties available to uniquely identify a GUI element. By increasing the number of possible combinations of GUI element properties, it is presumed that uniquely specifying a GUI element merely is a matter of selecting enough properties in combination with one another such that no other GUI element is likely to be confused with the intended GUI element. In any case, where a desired object cannot be located during the testing phase of an application, an "object not found" exception can arise defeating the operation of the functional testing tool, regardless of the augmentation of the number of properties available to uniquely identify the GUI element.

SUMMARY OF THE INVENTION

The present invention is a system, method and apparatus for disambiguating like objects in an application under test. In accordance with the inventive arrangements, a method for disambiguating like objects in an application under test can include obtaining a reference to a related object which is related to one of the like objects in the application under test and providing the reference to the related object as a parameter to a function call for performing an operation upon the one object in the application under test. Specifically, the operation can be performed by locating the one object through a relationship between the object and the reference.

The obtaining step can include the step of obtaining a reference to a content browser hosting the one object. In this regard, the providing step can include providing the reference as a parameter to a function call for an object directly associated with the content browser. More particularly, the providing step comprises the step of providing the reference as a parameter to a function call to manipulate a button disposed in a tool bar directly associated with the content browser.

Alternatively, the obtaining step can include obtaining a reference to an application hosting the one of the like objects. Specifically, the obtaining step can include the step of retrieving the reference to the application when creating an instance of the application. In both cases, the one of the like objects can be definitively located despite the similarity between multiple ones of the objects across multiple containers. As a result, during the playback phase of a functional test, the processing of the testing script will not fail for failure to properly identify the element of interest.

A system for disambiguating two like objects in two separate application containers can include a record process configured to produce both a test script and an object mapping. A playback process further can be included and can be configured to process the test script. Finally, an object manager can be coupled to the playback process and configured to obtain a reference to a related object which is related to one of the like objects in the application under test. The object manager further can be configured to provide the reference as a parameter to a function call for performing an operation upon the one object in the application under test by locating the one object through a relationship between the one object and the reference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for disambiguating two like objects in two separate application containers. In accordance with the present invention, a pointer to one of the application containers can be obtained. Subsequently, the pointer can be provided as a parameter to a function call for an object in the one of the separate application containers. Notably, the application container can include one of a content browser and a distributable application.

Figure 1:
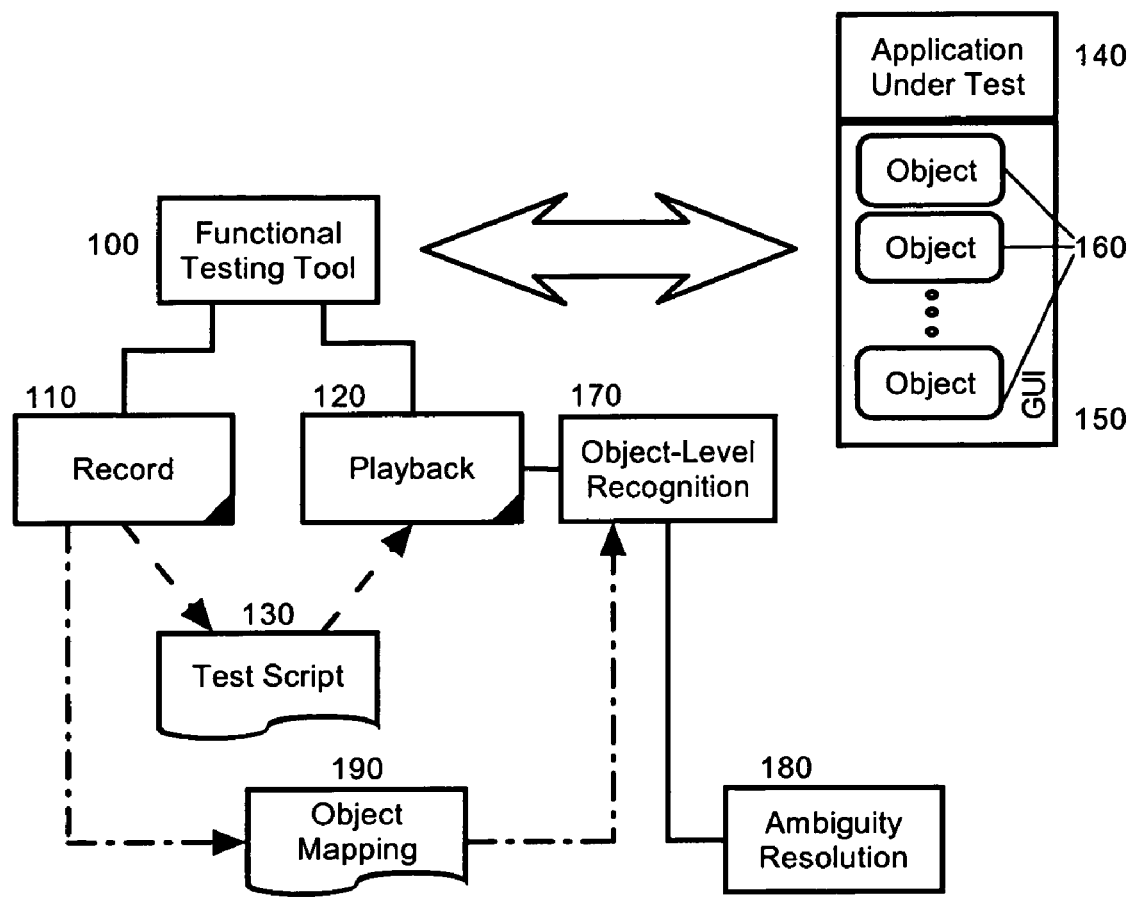
FIG. 1 is a pictorial illustration of a functional testing system which has been configured to disambiguate two like objects in an application under test in accordance with the inventive arrangements; and, FIG. 2 is a flow chart illustrating a process for disambiguating two like objects in two separate application containers in an application under test in the system of FIG. 1.

FIG. 1 is a pictorial illustration of a functional testing system which has been configured for disambiguation in accordance with the inventive arrangements. The system can include a functional testing tool 100 configured to test the functionality of the GUI 150 of an application under test 140. Functional testing tools are well-known in the art and can include by way of example, the testing tool family of products produced by Rational Software of Lexington, Mass., United States of America, now a division of International Business Machines Corporation of Armonk, N.Y., United States of America.

The functional testing tool 100 can test the GUI 150 of the application under test initially through a recording process 110. In the recording process 110, user interactions with objects 160 in the GUI 150 can be captured from which a test script 130 can be produced. The test script 130, in turn can be process by a playback process 120 to reproduce the interactions of the user with the objects 160 of the GUI 150. Typical interactions include mouse clicks depressing buttons, selecting list items and providing keyboard input to edit boxes, though the skilled artisan will recognize that the foregoing list of typical interactions hardly represents an exclusive listing. In any case, the test script 130 can include several categories of executable statements, including statements directing the emulation of user actions, statements for validating application states, and other miscellaneous statements such as a command for launching an application.

Importantly, an object manager configured to perform object-level recognition 170 can be included in the functional testing tool 100 with which objects 160 within the GUI 150 which are required for use by statements in the test script 130 can be located. More particularly, during the recording process 110, an object mapping 190 can be constructed for each object 160 implicated by the test script 130. The object mapping 190 can include mapped objects which represent one of a direct referring means, or an indirect means of accessing and managing objects 160 in the GUI 150. The mapped objects preferably can include properties and methods that enable the object manager 170 to recognize and manage objects 160 during the playback process 120.

In a preferred aspect of the present invention, a test object can be constructed which can include a reference to a corresponding object 160 in the GUI 150 of the application under test 140. The reference either can point directly to the object, or to a uniquely identified description. Where the reference points to a uniquely defined description, the reference can be included in the object mapping 190. To that end, the reference can include a collection of name/value pairs that describe the properties and expected values of an object 160 in the GUI 150. Thus, the object mapping 190 can be an approximate representation for the hierarchy of objects 160 in the GUI 150.

In operation, when a method is invoked on a test object by way of a statement in the test script 130, the object manager 170 can search the GUI 150 for an object 160 which at least partially matches a description of the invoked test object. It will be recognized by the skilled artisan, however, that in some situations, during the playback process 120 the object manager 170 may not be able to differentiate between two like objects 160 in the GUI 150. For instance, in an HTML application, when more than one instance of a browser is active, recognizing one browser from another on toolbar actions can be difficult if not impossible if the toolbar actions were recorded in the test script 130 as "BrowserToolbar_Back( ).click( );" and "BrowserToolbar_Forward( ).click( );". To resolve such ambiguity, in the present invention, an ambiguity resolution system 180 can locate the toolbar button in the browser that is identified by its currently loaded document. In this regard, the currently loaded document can act as an anchor to the browser. Hence, the statement "BrowserToolbar_Back(Browser_htmlBrowser (Document_MyHomePage( ))click( );" can represent such use of an anchor as will be further described herein in reference to FIG. 2.

Figure 2:
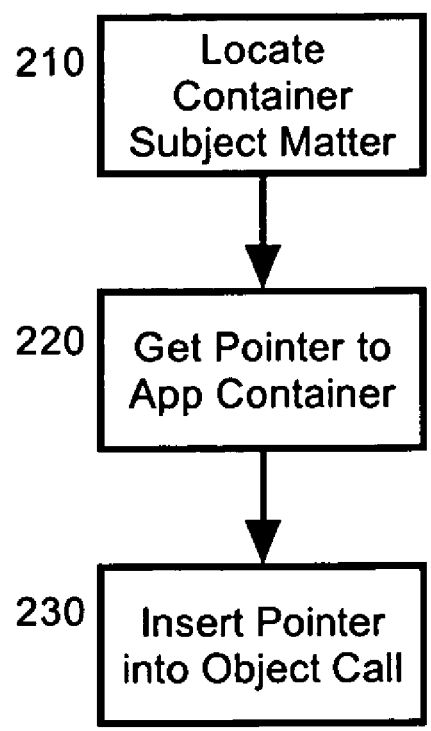

FIG. 2 is a flow chart illustrating a fundamental process for disambiguating like GUI objects in one or more applications under test. Beginning in block 210, the subject matter of a user interface can be located, such as a home page of a content browser, or the name of a distributable application. Once located, in block 220, a pointer can be obtained to the application container. As an example, a pointer can be obtained to a distributable application when the application is launched. For instance, when launching the application labeled "MyApp", the call MyAppPtr=startApp("MyApp") can return a pointer to the application container. Alternatively, a pointer to a content browser can be obtained by dereferencing a home page in the content browser. In either case, once a pointer has been obtained to the application container, in block 230 an object unique to the container can be definitely identified.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for disambiguating like objects in an application under test, the method comprising the steps of:
   obtaining a reference to a related object which is related to one of the like objects in the application under test;
   providing said reference to the related object as a parameter to a function call; and,
   performing an operation upon said one of the like objects in the application under test by locating said one of the like objects through a relationship between said one of the like objects and said reference,
   herein said obtaining step comprises the step of obtaining a reference to a content browser hosting said one of the like objects.

2. The method of claim 1, wherein said providing step comprises the step of providing said reference as a parameter to a function call for an object directly associated with said content browser.

3. The method of claim 1, wherein said providing step comprises the step of providing said reference as a parameter to a function call to manipulate a button disposed in a tool bar directly associated with said content browser.

4. A machine readable storage having stored thereon a computer program for disambiguating two like objects in two separate application containers, the computer program comprising a routine set of instructions which when executed by the machine cause the machine to perform the steps of:
   obtaining a reference to a related object which is related to one of the like objects in the application under test;
   providing said reference to the related object as a parameter to a function call; and,
   performing an operation upon said one of the like objects in the application under test by locating said one of the like objects through a relationship between said one of the like objects and said reference,
   wherein said obtaining step comprises the step of obtaining a reference to a content browser hosting said one of the like objects.

5. The machine readable storage of claim 4, wherein said providing step comprises the step of providing said reference as a parameter to a function call for an object directly associated with said content browser.

6. The machine readable storage of claim 4, wherein said providing step comprises the step of providing said reference as a parameter to a function call to manipulate a button disposed in a tool bar directly associated with said content browser.

* * * * *